(12) United States Patent
Nakaie et al.

(10) Patent No.: US 8,218,203 B2
(45) Date of Patent: Jul. 10, 2012

(54) STRUCTURE FOR HOLDING OPTICAL COMPONENT, AND OPTICAL SCANNING DEVICE AND IMAGE FORMING APPARATUS INCLUDING THE SAME

(75) Inventors: Katsuhiko Nakaie, Kanagawa (JP); Fumiya Hisa, Kanagawa (JP); Toshiharu Orui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 499 days.

(21) Appl. No.: 12/553,213

(22) Filed: Sep. 3, 2009

(65) Prior Publication Data

US 2010/0245939 A1   Sep. 30, 2010

(30) Foreign Application Priority Data

Mar. 30, 2009 (JP) ................ P2009-080915

(51) Int. Cl.
*H04N 1/04* (2006.01)
(52) U.S. Cl. ......... 358/474; 358/481; 358/482; 358/496
(58) Field of Classification Search .................. 358/474, 358/481, 482, 496, 497, 498
See application file for complete search history.

(56) References Cited

U.S. PATENT DOCUMENTS

| 5,255,115 | A | * | 10/1993 | Kikuchi | 359/209.1 |
| 7,643,230 | B2 | * | 1/2010 | Feklistov | 359/811 |

| 2002/0141186 | A1 | 10/2002 | Takase |
| 2004/0100673 | A1 | 5/2004 | Sakai et al. |
| 2006/0139715 | A1 | 6/2006 | Tamaru et al. |

FOREIGN PATENT DOCUMENTS

| JP | 5-22530 | 1/1993 |
| JP | 2910652 B | 4/1999 |
| JP | 2001-111155 | 4/2001 |
| JP | 2003-172896 | 6/2003 |
| JP | 2004-163463 | 6/2004 |
| JP | 2004-301940 | 10/2004 |
| JP | 2004-309902 | 11/2004 |
| JP | 2006-178370 | 7/2006 |
| JP | 2007-108762 | 4/2007 |
| JP | 4050003 B | 12/2007 |

* cited by examiner

*Primary Examiner* — Houshang Safaipour
(74) *Attorney, Agent, or Firm* — Morgan, Lewis & Bockius LLP

(57) ABSTRACT

A structure for holding an optical component, includes: first and second flat plate portions provided in a state where the portions stand on a base plate, opposed to each other in a state where the flat plate portions are coupled to each other, and constituting first and second hierarchies, respectively; first and second positioning portions that are provided at the first flat plate portion, and that determine positions of directions of first and second coordinate axes of first, second, and third coordinate axes that intersect with each other; a third positioning portion that is provided at the second flat plate portion, and that determines a position of a direction of the third coordinate axis of the first, second, and third coordinate axes that intersect with each other; and a holding portion coupled to the first flat plate portion or the second flat plate portion, and holding the optical component.

5 Claims, 18 Drawing Sheets

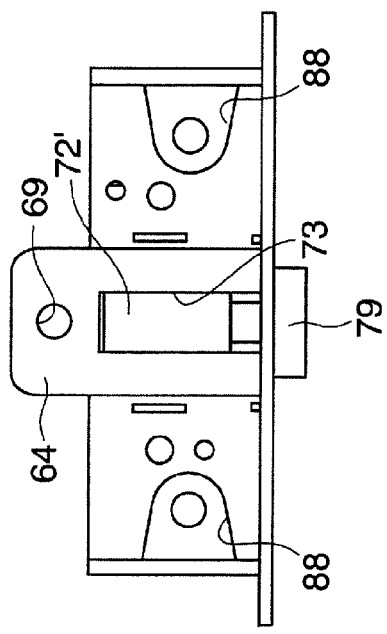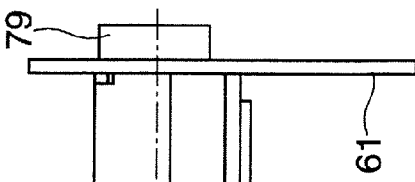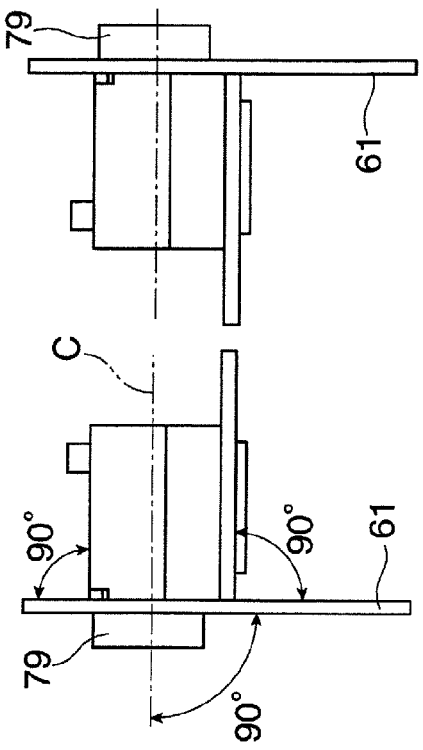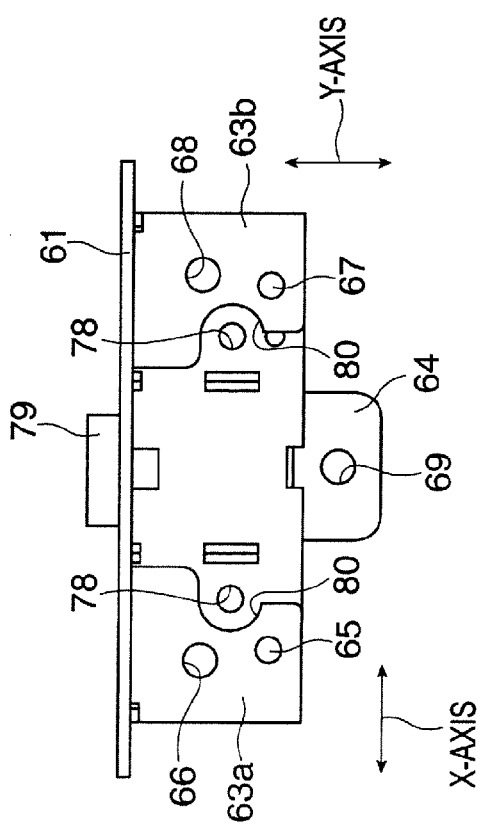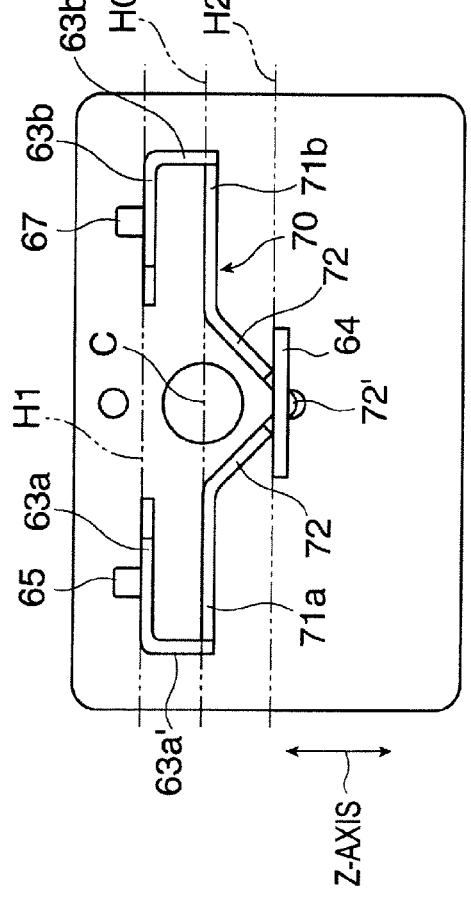

FIG. 22
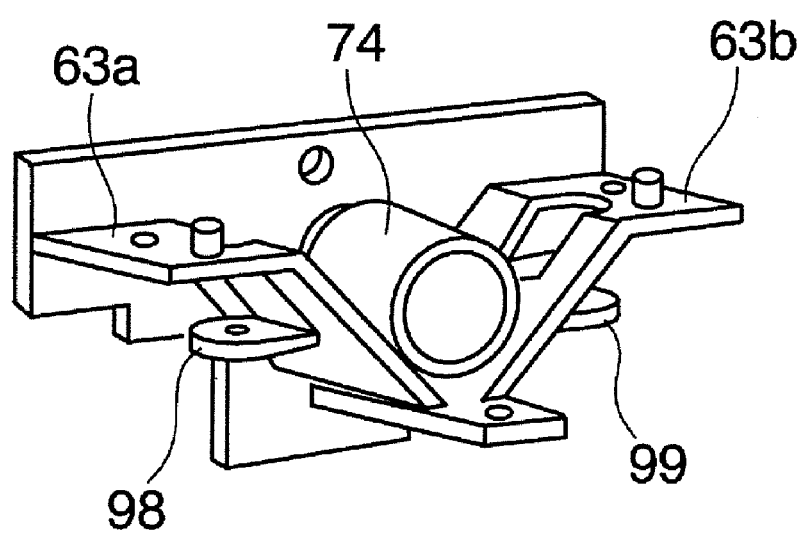
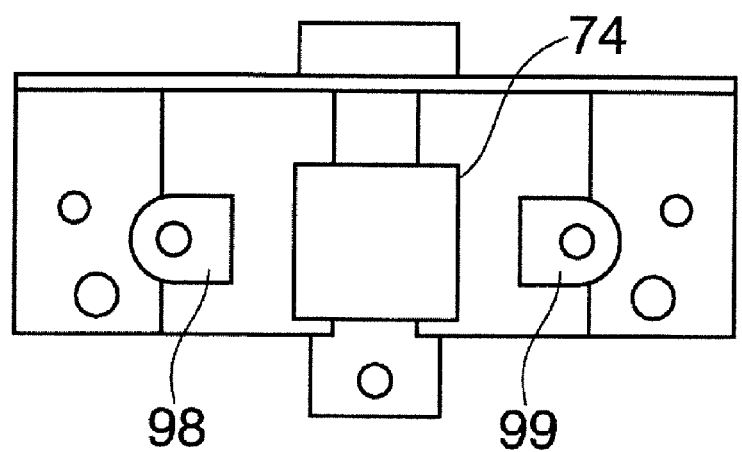

STRUCTURE FOR HOLDING OPTICAL COMPONENT, AND OPTICAL SCANNING DEVICE AND IMAGE FORMING APPARATUS INCLUDING THE SAME

CROSS-REFERENCE TO RELATED APPLICATIONS

This application is based on and claims priority under 35 USC 119 from Japanese Patent Application No. 2009-080915 filed on Mar. 30, 2009.

BACKGROUND

TECHNICAL FIELD

The present invention relates to a structure for holding an optical component, and an optical scanning device and image forming apparatus which includes the structure.

SUMMARY

According to an aspect of the invention, there is provided a structure for holding an optical component, including: first and second flat plate portions that are provided in a state where the portions stand on a base plate, that are opposed to each other in a state where the flat plate portions are coupled to each other, and that constitute first and second hierarchies, respectively; first and second positioning portions that are provided at the first flat plate portion, and that determine positions of directions of first and second coordinate axes of first, second, and third coordinate axes that intersect with each other; a third positioning portion that is provided at the second flat plate portion, and that determines a position of a direction of the third coordinate axis of the first, second, and third coordinate axes that intersect with each other; and a holding portion that is coupled to the first flat plate portion or the second flat plate portion, and that holds the optical component.

BRIEF DESCRIPTION OF THE DRAWINGS

Exemplary embodiments of the present invention will be described in detail based on the following figures, wherein:

FIGS. 9A, 9B, 9C, 9D and 9E are configuration views showing the holding member;

FIG. 22 is a perspective configuration view showing a structure of attaching an optical component relating to Exemplary embodiment 4 of the invention.

DESCRIPTION OF REFERENCE NUMERALS AND SIGNS

15: optical scanning device, 20: semiconductor laser light source, 21: collimator lens (optical component), 53: printed wiring board assembly (PWBA), 59: driving circuit, 60: holding member, 61: base plate, 63a, 63b: first flat plate portion, 64: second flat plate portion, 65: first protrusion, 67: second protrusion, 69: third insertion hole.

DETAILED DESCRIPTION

Figure 2:
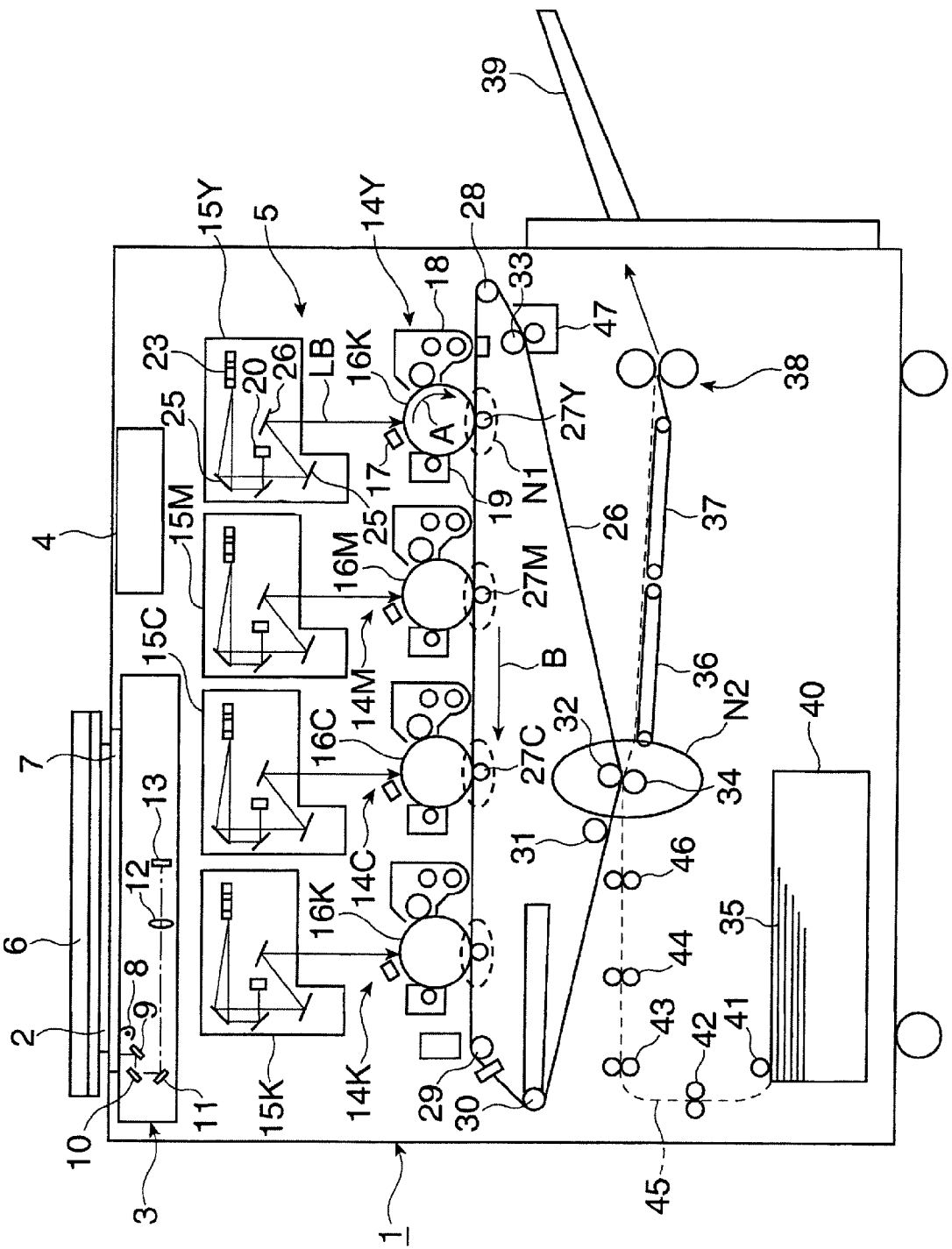
FIG. 2 is a diagram showing a tandem full color printer that is an image forming apparatus to which the structure of attaching an optical component relating to Exemplary embodiment 1 of the invention is applied.

Hereinafter, exemplary embodiments of the invention will be described with reference to the drawings.
Exemplary Embodiment 1
FIG. 2 is a diagram showing a tandem digital full-color printer that is an image forming apparatus to which an optical scanning device using a structure of holding an optical component of Exemplary embodiment 1 of the invention is applied. The tandem digital color printer includes an image reading device, and functions also as a color copier and a facsimile apparatus. It is a matter of course that the image forming apparatus may not include the image reading device, and may form an image based on image data supplied from a personal computer (not shown) or the like.

Referring to FIG. 2, 1 denotes a main unit of the tandem digital color printer, and the digital color printer main unit 1 includes an image reading device 3 which reads an image of an original 2, in an upper portion of one side (in the illustrated example, the left side) of the main unit. In the color printer main unit 1, an image processing device 4 is disposed which applies a predetermined image process on image data supplied from the image reading device 3, a personal computer (not shown), or the like, or those sent through a telephone line, a LAN, or the like. An image outputting device 5 that outputs an image on the basis of the image data on which the predetermined image process is applied in the image processing device 4 is disposed in the digital color printer main unit 1.

The image reading device 3 is configured so that, when a platen cover 6 is opened, the original 2 is placed on a platen glass 7, a light source 8 illuminates the original 2 placed on the platen glass 7, an image reading element 13 configured by a CCD or the like is scan-exposed with a reflected light image from the original 2 through a reduction scanning optical system configured by a full-rate mirror 9, half-rate mirrors 10, 11, and an imaging lens 12, and the image of the original 2 is read at a predetermined dot density by the image reading element 13.

The image of the original 2 read by the image reading device 3 is sent in the form of (for example, 8-bit) reflectance data of three colors such as red (R), green (G), and blue (B), to the image processing device 4. In the image processing device 4, predetermined image processes such as shading correction, position deviation correction, brightness/color spatial conversion, gamma conversion, frame deletion, and color/movement edition are applied on the reflectance data of the original 2.

The image data on which the predetermined image processes are applied in the image processing device 4 as described above are converted to image data of four colors of yellow (Y), magenta (M), cyan (C), and black (K) by the same image processing device 4, and then sent to optical scanning devices 15Y, 15M, 15C, 15K of image forming units 14Y, 14M, 14C, 14K for yellow (Y), magenta (M), cyan (C), and black (K). In the optical scanning devices 15Y, 15M, 15C, 15K, image exposure is performed by a laser beam LB in accordance with image data of the corresponding color.

In the tandem digital color printer main unit 1, as described above, the four image forming units 14Y, 14M, 14C, 14K for yellow (Y), magenta (M), cyan (C), and black (K) are horizontally arranged in a parallel manner while forming intervals therebetween.

As shown in FIG. 2, the four image forming units 14Y, 14M, 14C, 14K are configured in the same manner except the color of an image to be formed. Roughly, each of the image forming units is configured by: a photosensitive drum 16 functioning as an image carrier which is rotated in the direction of arrow A at a predetermined speed; a scorotron 17 for primary charging which uniformly charges the surface of the photosensitive drum 16; the optical scanning device 15 functioning as an image writing unit which applies image exposure to the surface of the photosensitive drum 16 on the basis of image data corresponding to the each color to form an electrostatic latent image; a developing device 18 which develops the electrostatic latent image formed on the photosensitive drum 16 by a toner; and a cleaning device 19 which removes a tone and like residuals remaining on the surface of the photosensitive drum 16.

As shown in FIG. 2, the image processing device 4 sequentially supplies image data of the respective colors to the optical scanning devices 15Y, 15M, 15C, 15K of the image forming units 14Y, 14M, 14C, 14K for yellow (Y), magenta (M), cyan (C), and black (K), and the laser beams LB which are emitted from the optical scanning devices 15Y, 15M, 15C, 15K in accordance with the image data scan-expose the surfaces of the corresponding photosensitive drums 16Y, 16M, 16C, 16K to form electrostatic latent images. The electrostatic latent images formed on the surfaces of the corresponding photosensitive drums 16Y, 16M, 16C, 16K are developed by the developing devices 18Y, 18M, 18C, 18K, as color toner images of yellow (Y), magenta (M), cyan (C), and black (K), respectively.

The color toner images of yellow (Y), magenta (M), cyan (C), and black (K) which are sequentially formed on the photosensitive drums 16Y, 16M, 16C, 16K of the image forming units 14Y, 14M, 14C, 14K are multiply transferred by primary transfer roll 27Y, 27M, 27C, 27K onto an intermediate transfer belt 26 functioning as an endless belt-like intermediate transfer member which is placed below the image forming units 14Y, 14M, 14C, 14K, at respective primary transfer positions N1 as shown in FIG. 2. The intermediate transfer belt 26 is wound at a constant tension around a driving roll 28, a tensioning roll 29, a meandering controlling roll 30, a driven roll 31, a back-up roll 32, and a driven roll 33, and circularly driven at a predetermined moving speed in the direction of arrow B by the driving roll 28 which is rotatingly driven by a dedicated driving motor that has an excellent constant speed property, and that is not shown. An endless belt-like member produced by forming a film of a flexible synthetic resin such as polyimide or polyamide-imide into a belt-like shape, and connecting the both ends of the synthetic resin film formed into a belt-like shape to each other by welding or the like may be used as the intermediate transfer belt 26.

The color toner images of yellow (Y), magenta (M), cyan (C), and black (K) which are multiply transferred onto the intermediate transfer belt 26 are secondary-transferred at a secondary transfer position N2 by an electrostatic force onto a recording sheet 35, by application of a transfer voltage of the same polarity (negative polarity) as that of the toners by the back-up roll 32, and also by a secondary transfer roll 34 which is pressingly contacted with the back-up roll 32 and grounded. The recording sheet 35 onto which toner images corresponding to colors of images to be formed are transferred is conveyed to a fixing device 38 by two conveyor belts 36, 37. The recording sheet 35 onto which the color toner images are transferred undergoes a fixing process by means of heat and pressure in the fixing device 38, and then discharged onto a discharge tray 39 disposed outside the printer main unit 1.

As shown in FIG. 2, as the recording sheet 35, a sheet of the desired size and quality is fed from a sheet feed tray 40 disposed at a bottom portion of the printer main unit 1, in a one-by-one separated manner by a sheet feeding roll 41 and a pair of sheet separation rolls (not shown), and once conveyed to a registration roll 46 through a sheet conveying path 45 in which a plurality of conveying rolls 42, 43, 44 are disposed. The recording sheet 35 which is fed from the sheet feed tray 40 is sent to the secondary transfer position N2 of the intermediate transfer belt 26 by the registration roll 46 which is rotatingly driven at a predetermined timing. Although only one sheet feed tray 40 is shown in the figure, a plurality of sheet feed trays respectively housing recording sheets 35 of different sizes or the same size may be disposed. Many recording sheets 35 can be fed from the sheet feed tray 40.

In advance of the sheet feeding, in the four image forming units 14Y, 14M, 14C, 14K of yellow, magenta, cyan, and black, the toner images of yellow, magenta, cyan, and black are sequentially formed at predetermined timings as described above, respectively.

After the toner image transferring step, in the photosensitive drums 16Y, 16M, 16C, 16K, residual toners and the like are removed by the cleaning devices 19Y, 19M, 19C, 19K, and preparations for the next image forming process are made. In the intermediate transfer belt 26, residual toners, paper dusts, and the like are removed by a belt cleaner 47 which is disposed so as to be opposed to the driven roll 33.

Figure 3:
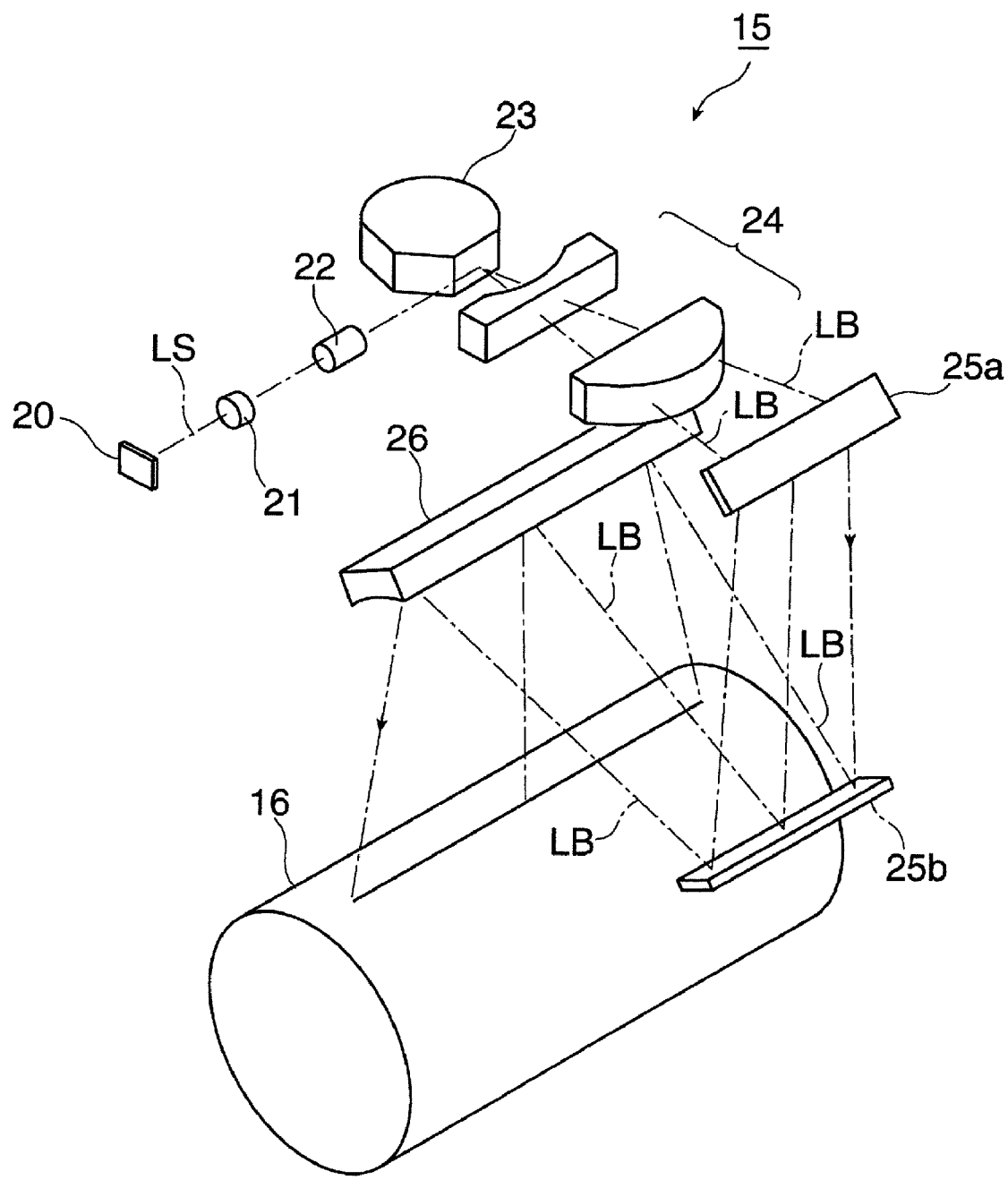
FIG. 3 is a perspective diagram showing an optical scanning device to which the structure of attaching an optical component relating to Exemplary embodiment 1 of the invention is applied.

FIG. 3 is a diagram showing the optical scanning device of the thus configured digital color printer.

In the optical scanning device 15 of the exemplary embodiment, as shown in FIG. 3, a semiconductor laser light source 20 is modulated in accordance with the image data of the corresponding color output from the image processing device 4, and the semiconductor laser light source 20 emits the laser beams LB in accordance with the image data. The laser beams LB emitted from the semiconductor laser light source 20 impinges on the surface of a rotary polygon mirror 23 through a collimator lens 21 and a cylindrical lens 22 to be deflection-scanned by the rotary polygon mirror 23, and then scan-exposes the photosensitive drum 16 in the rotation axis direction (the main scanning direction) through an f-θ lens 24, two reflecting mirror 25a, 25b, and a cylindrical mirror 27.

Figure 4:
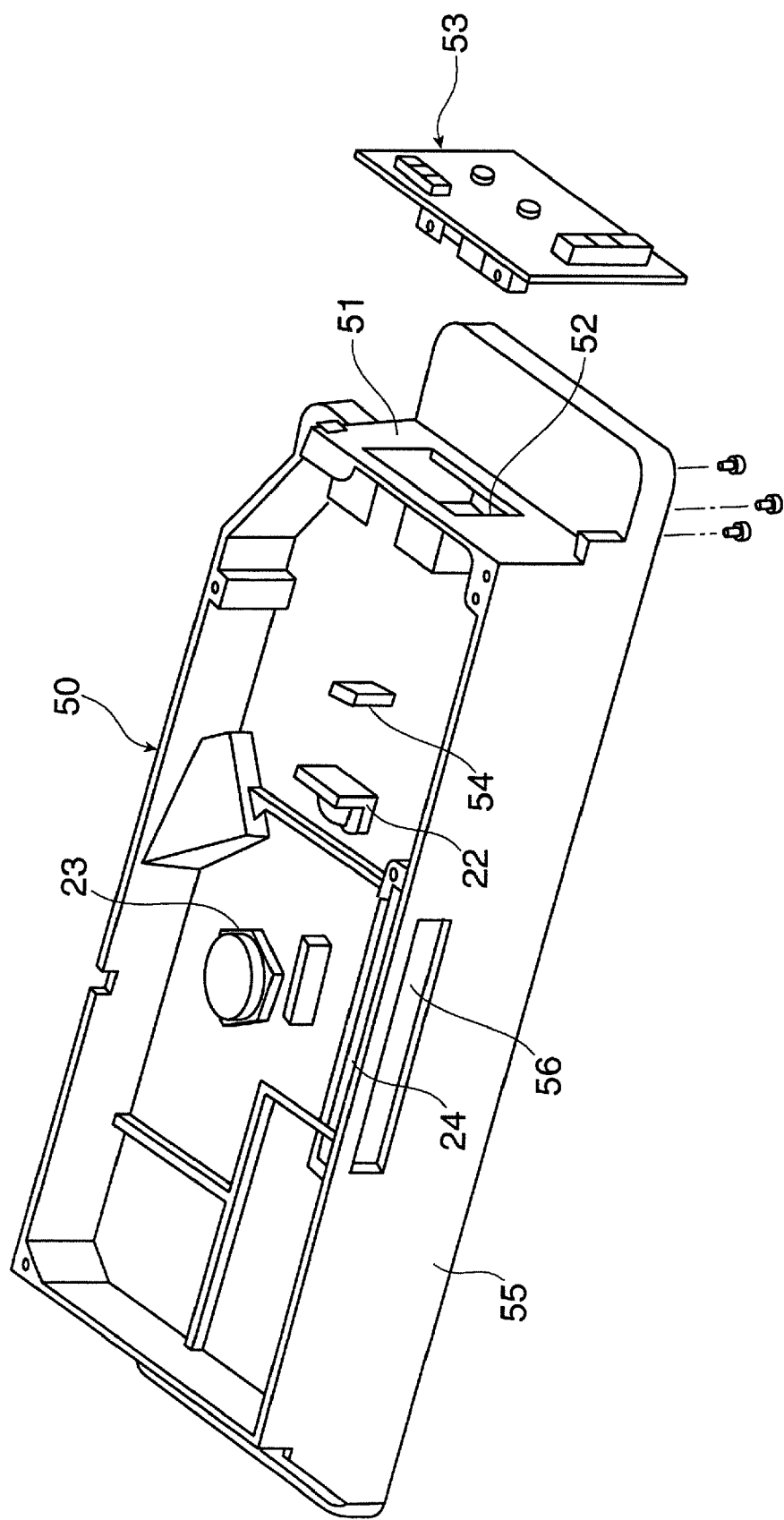
FIG. 4 is a perspective configuration view showing the optical scanning device to which the structure of attaching an optical component relating to Exemplary embodiment 1 of the invention is applied.
Figure 5:
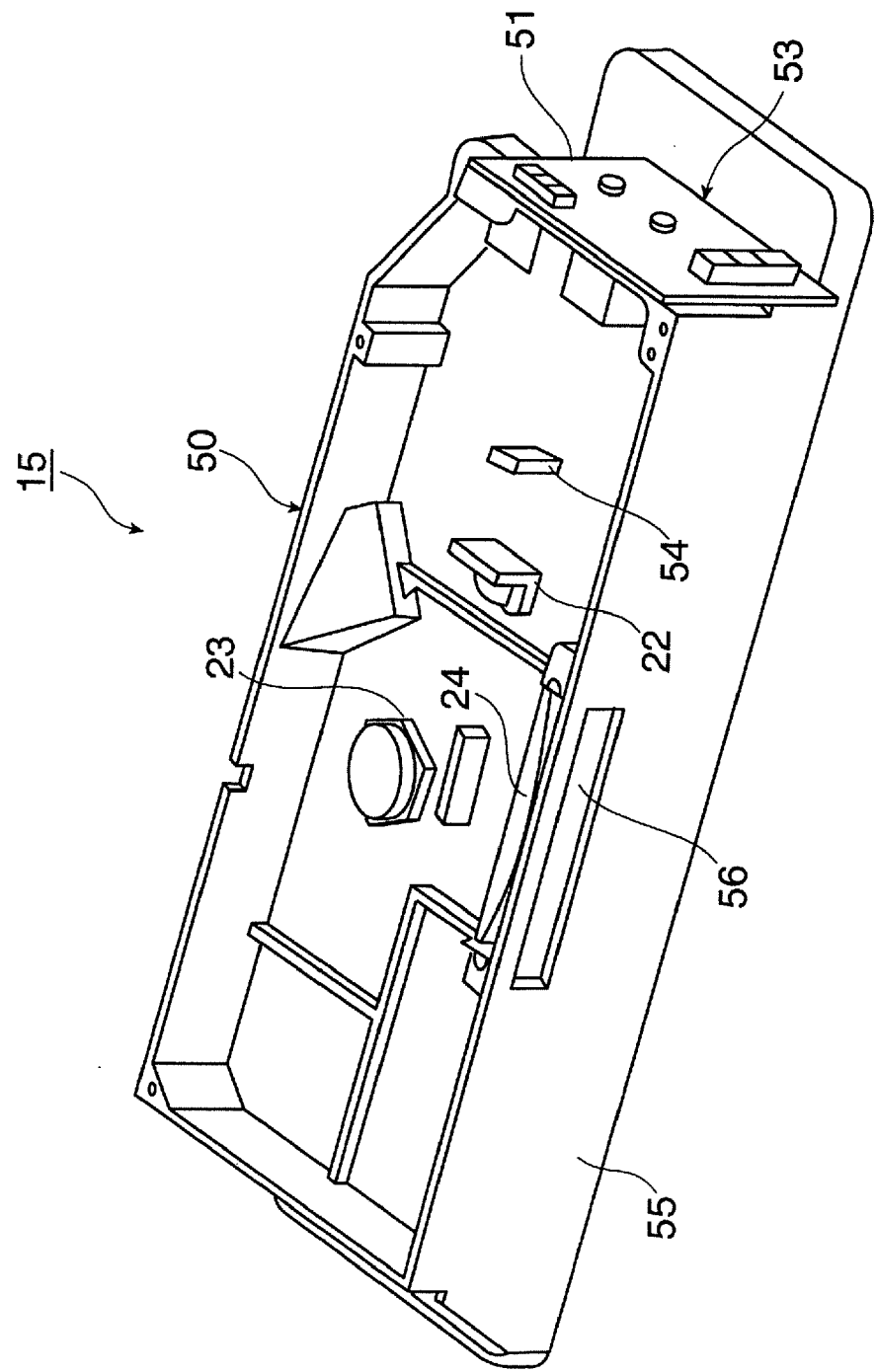
FIG. 5 is a perspective configuration view showing the optical scanning device to which the structure of attaching an optical component relating to Exemplary embodiment 1 of the invention is applied.

As shown in FIGS. 4 and 5, the optical scanning device 15 includes a device housing 50 configured by an aluminum die-cast. The device housing 50 is formed into a flat box-like shape in which the whole upper end face is opened, which has a relatively low height, and which is rectangular in a plan view. Among the side walls of the device housing 50, in one side wall 51 which is relatively short in length, a rectangular opening 52 is disposed as shown in FIG. 4. A printed wiring board assembly (PWBA) 53 on which the semiconductor laser light source 20 and the collimator lens 21 are attached is mounted in the opening 52.

As shown in FIGS. 4 and 5, a slit 54 which focuses the laser beams LB that is emitted from the semiconductor laser light source 20 through the collimator lens 21, the cylindrical lens 22, and the rotary polygon mirror 23 are disposed on the bottom face of the device housing 50. In the device housing 50, furthermore, the f-θ lens 24 which images the laser beams LB deflection-scanned by the rotary polygon mirror 23 so as to produce different focal lengths depending on the deflection angle is attached in the vicinity of another side wall 55 disposed at a position intersecting with the semiconductor laser light source 20, and a thin opening 56 which allows the laser beams LB deflection-scanned by the rotary polygon mirror 23 to pass therethrough is disposed at the other wall 55.

Figure 6:
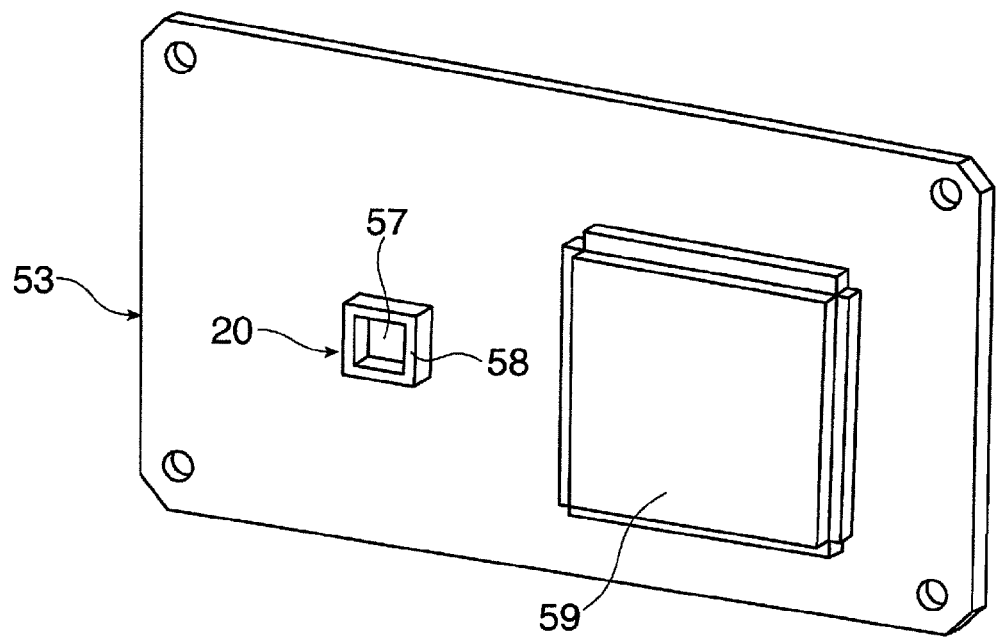
FIG. 6 is a perspective configuration view showing the structure of attaching an optical component relating to Exemplary embodiment 1 of the invention is applied.

As shown in FIG. 6, the semiconductor laser light source 20 is mounted on a predetermined position of the printed wiring board assembly (PWBA) 53, together with a driving circuit 59 configured by an LSI for driving the semiconductor laser light source 20, and the like. The semiconductor laser light source 20 includes an emission end face 57 from which a plurality of laser beams modulated in accordance with image information are emitted, and is disposed on the surface of a rectangular frame member in which a flat reference face 58 is formed in a higher level. In the semiconductor laser light source 20, the plurality of laser beams are emitted from the emission end face 57 at an angle of about 90 degrees with respect to the reference face 58.

Figure 7:
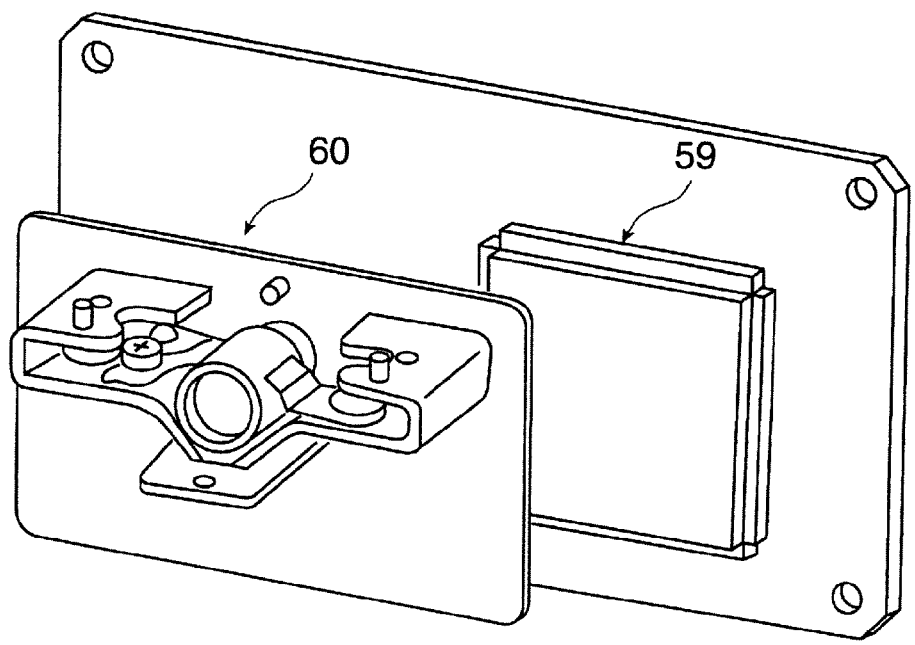
FIG. 7 is a perspective configuration view showing the structure of attaching an optical component relating to Exemplary embodiment 1 of the invention.

As shown in FIGS. 6 and 7, the driving circuit 59 configured by the LSI for driving the semiconductor laser light source 20, and the like is mounted on the printed wiring board assembly 53. As the semiconductor laser light source 20, a configuration where, for example, 8×4=32 laser beams LB are emitted with being simultaneously modulated in accordance with image data may be employed. As shown in FIGS. 4 and 5, in a state where a holding member 60 holding the collimator lens 21 is attached as described later, the printed wiring board assembly 53 is foxed to one side wall 61 of the device housing 50 by means such as screwing as shown in FIG. 4.

Figure 8A:
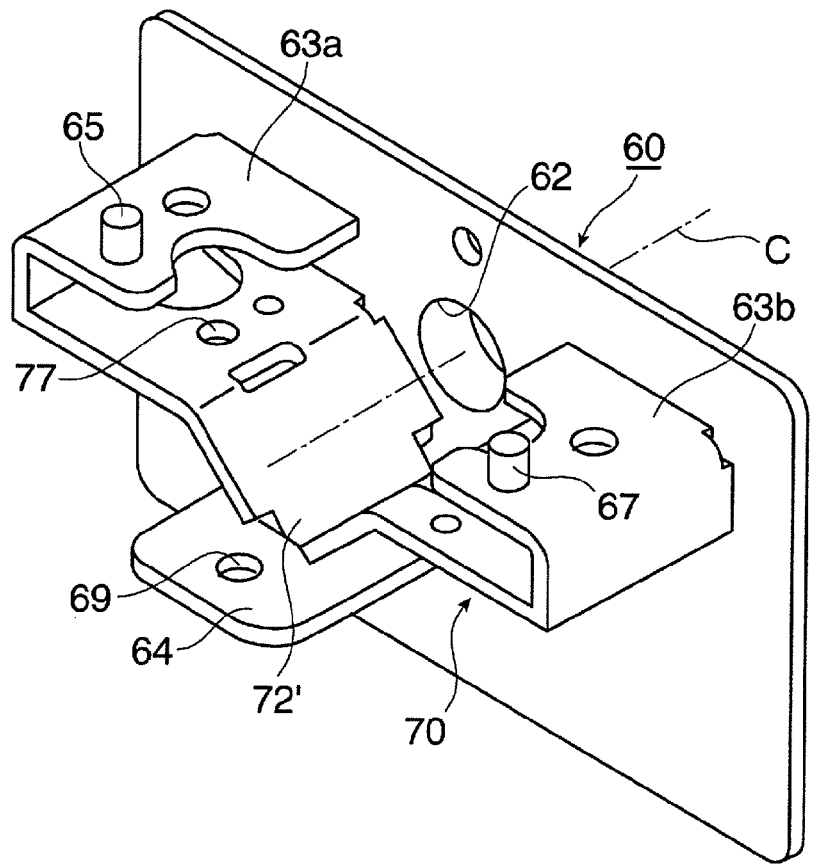
FIGS. 8A and 8B are configuration views showing a holding member.

As shown in FIG. 8A, the holding member 60 holding the collimator lens 21 is configured by bending sheet metals which are metal plate members, such as stainless steel plates, and then coupling them together by means of welding or the like. The holding member 60 includes a base plate 61 which is placed so as to intersect with the optical axis C of the collimator lens 21 that is an optical component, with forming an angle of about 90 degrees with respect to the optical axis, and which is formed into a rectangular shape in the front view by a stainless steel plate or the like. An opening 62 through which the laser beams LB emitted from the semiconductor laser light source 20 can pass is circularly opened in the base plate 61.

As shown in FIGS. 9A to 9E, a first flat plate portion 63 which constitutes a first hierarchy H1 that is placed in parallel to one plane H0 passing through the optical axis C of the collimator lens 21, and a second flat plate portion 64 which constitutes a second hierarchy H2 are attached to the base plate 61 while standing at an angle of about 90 degrees with respect to the surface of the base plate 61, in a state where the portions are coupled to each other and opposed to each other, by fitting welding in which welding is performed in a state where at least parts of basal end portions of the flat plate portions 63, 64 are fitted into grooves disposed at the surface of the base plate 61. The first and second flat plate portions 63, 64 are formed by sheet metals which are metal plate members, such as stainless steel plates. In this way, the first and second flat plate portions 63, 64 are fitting-welded to the base plate 61, and therefore can be accurately attached in a state where the rigidity is enhanced.

The first flat plate portion 63 is divided into left and right flat plate portions 63a, 63b. The left and right first flat plate portions 63a, 63b are bilaterally symmetrically formed. In the left first flat plate portion 63a, a columnar first protrusion 65 is upward protruded. The first protrusion functions as a first positioning portion which determines the position in the X-axis direction that is a first axis of the XYZ coordinate axes functioning as first to third axes intersecting perpendicular to each other. As shown in FIG. 9A, a first insertion hole 66 for screwing to the device housing 50 is disposed at the left first flat plate portion 63a.

Similarly, in the right first flat plate portion 63b, as shown in FIGS. 9A to 9E, a columnar second protrusion 67 is upward protruded. The second protrusion functions as a second positioning portion which determines the position in the Y-axis direction that is a second axis of the XYZ coordinate axes intersecting perpendicular to each other. A second insertion hole 68 for screwing to the device housing 50 is disposed at the right first flat plate portion 63b.

A cutaway portion 80 for allowing a screw to be inserted when the collimator lens 21 is to be screwed to a holding portion 70 as described later is arcuately formed in each of the left and right flat plate portions 63a, 63b.

As shown in FIG. 9A, the second flat plate portion 64 is formed longer than the first flat plate portion 63. In the second flat plate portion 64, a third insertion hole 69 for screwing to the device housing 50 is disposed as a third positioning portion which determines the position in the Z-axis direction that is a third axis of the XYZ coordinate axes intersecting perpendicular to each other.

In the first flat plate portion 63, both end portions in the outsides of the horizontal direction are downward bent by a short distance at an angle of about 90 degrees. In lower end portions of the bent portions 63a', 63b', the holding portion 70 which holds the collimator lens 21 is disposed so as to integrally couple the first and second flat plate portions 63, 64 with each other. The holding portion 70 is configured by: left and right attaching pieces 71a, 71b which are disposed in a substantially horizontal manner to be directed to the middle so as to approach each other; and a holding piece 72 which extends from middle end portions of the attaching pieces 71a, 71b, which is bent into a substantially V-like shape toward the second flat plate portion 64 to be integrally coupled with the second flat plate portion 64, and which holds the collimator lens 21. In the holding portion 70, outer end portions of the left and right attaching pieces 71a, 71b are integrally welded to lower end portions of the bent portions 63a', 63b' of the first flat plate portion 63. In the holding portion 70, moreover, a lower end portion 72' of the holding piece 72 which is bent into a substantially V-like shape is formed so that its width is narrower than the other portion of the holding piece 72, and, as shown in FIG. 9C, the lower end portion 72' of the holding piece 72 is integrally welded with an insertion hole 73 disposed at the second flat plate portion 64 in a state where the portion is inserted into the hole. The holding portion 70 is formed by a sheet metal which is a metal plate member, such as a stainless steel plate.

As described above, the first flat plate portion 63 and the holding portion 70 are welded and coupled in right and left end portions with each other to form a U-like section, and the second flat plate portion 64 and the holding portion 70 are welded with each other in the lower end portion 72' having the substantially V-like section shape, so that the first and second flat plate portions 63, 64 are coupled to each other through the holding portion 70 and have a very high rigidity. When the first and second flat plate portions 63, 64 and the holding portion 70 are attached to the base plate 61, therefore, the accuracies of the attaching positions of the first and second flat plate portions 63, 64 can be improved, and moreover the holding portion 70 which holds the collimator lens 21 that is an optical component can be accurately attached to the first and second flat plate portions 63, 64. As a result, the collimator lens 21 can be accurately held in the three dimensional directions to the holding member 60, and, when the collimator lens 21 is attached to the device housing 50 through the holding member 60, the holding accuracy and three-dimensional direction attaching accuracy of the collimator lens 21 can be largely improved.

Figure 1:
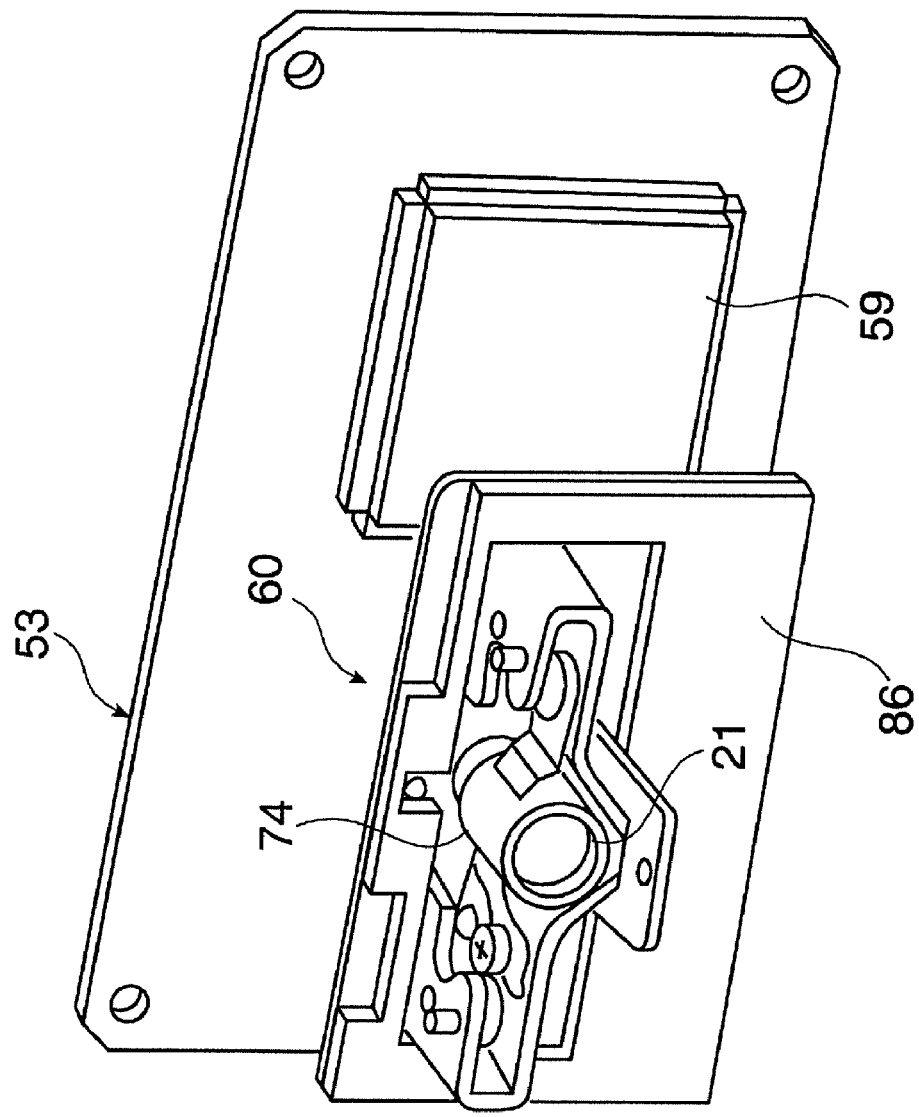
FIG. 1 is a perspective configuration view showing a structure of attaching an optical component relating to Exemplary embodiment 1 of the invention.
Figure 10:
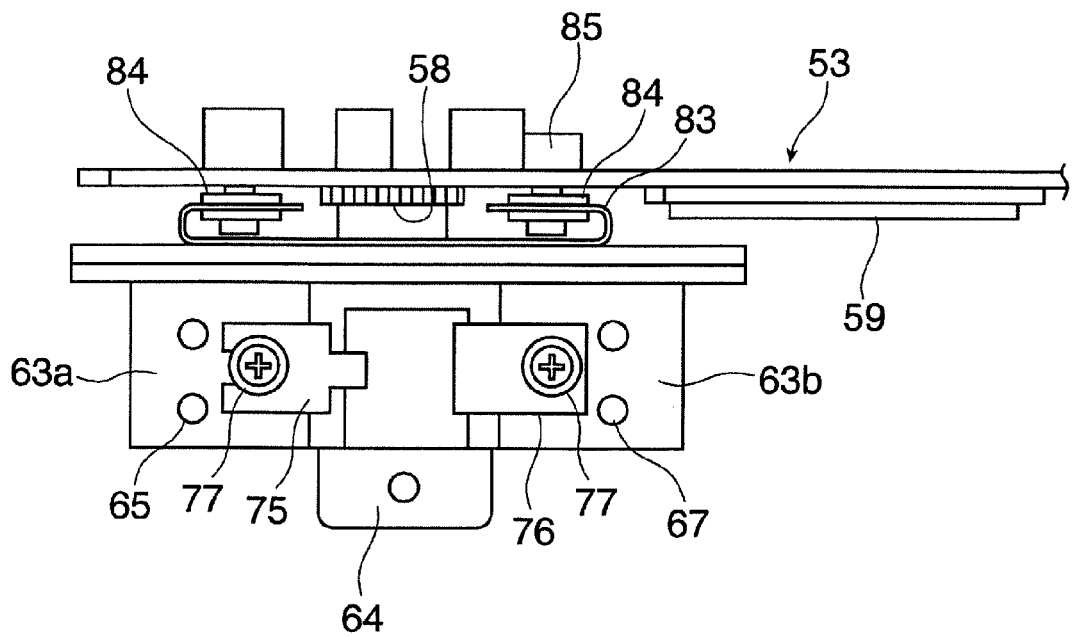
FIG. 10 is a plan configuration view showing the structure of attaching an optical component relating to Exemplary embodiment 1 of the invention.

As shown in FIG. 1, a cylindrical holder 74 which holds the collimator lens 21 is attached in a stacked state to the holding portion 70 of the holding member 60. As shown in FIG. 10, the collimator lens holder 74 is fixed by pressing members 75, 76 which are in a laterally separated manner above the holder, and each of which is configured be a plate spring. End portions of the pressing members 75, 76 are fixed by screws 77 to the left and right attaching pieces 71a, 71b of the holding portion 70. As shown in FIG. 10, in screw insertion holes of the pressing members 75, 76, one screw insertion hole is formed in a circular shape, and the other screw insertion hole is formed in a concave shape so that an outer end portion is opened. As shown in FIG. 9A, female thread portions 78 for fixing the pressing members 75, 76 by the screws 77 are disposed at the left and right attaching pieces 71a, 71b of the holding portion 70.

As shown in FIG. 9C, cutaway portions 88 through which screws are inserted when the left and right flat plate portions 63a, 63b are to be screwed to the device housing 50 are disposed in a substantially U-like shape at the left and right attaching pieces 71a, 71b of the holding portion 70.

Figure 8B:
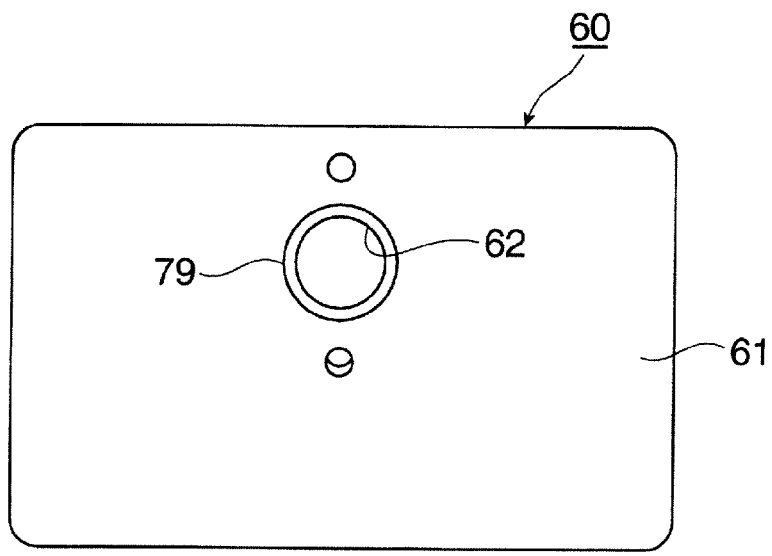

In the base plate 61 of the holding member 60, as shown in FIGS. 8A and 8B, the circular opening 62 through which the laser beams can pass is disposed at the middle of the plate as described above, and, on the back face side of the base plate 61, a cylindrical butting portion 79 is disposed at the position corresponding to the opening 62. As shown in FIG. 10, the reference face 58 of the semiconductor laser light source 20 is positioned on the tip end face of the butting portion 79 in a state where the reference face butts against the tip end face.

Figure 11:
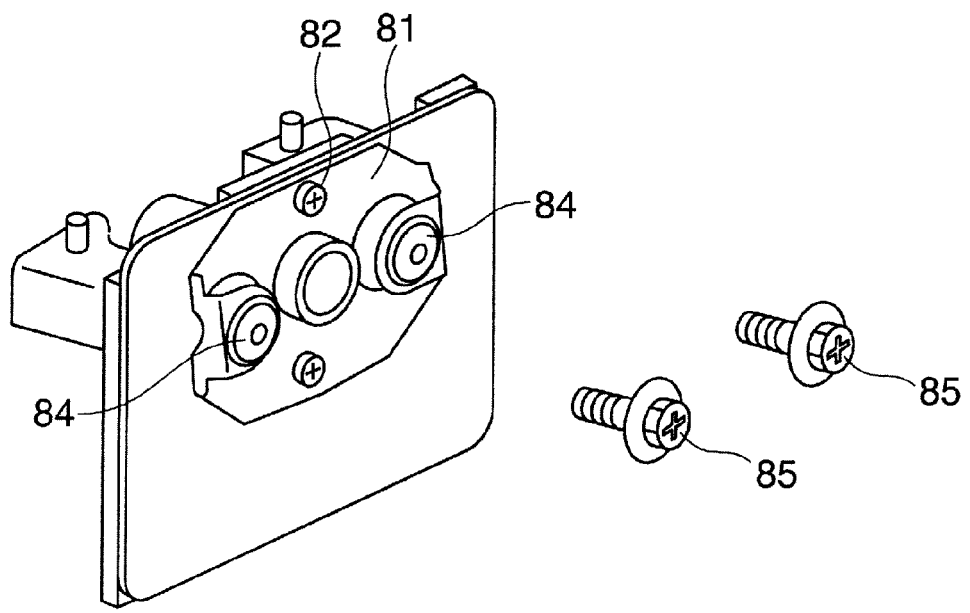
FIG. 11 is a perspective configuration view showing the structure of attaching an optical component relating to Exemplary embodiment 1 of the invention.
Figure 12:
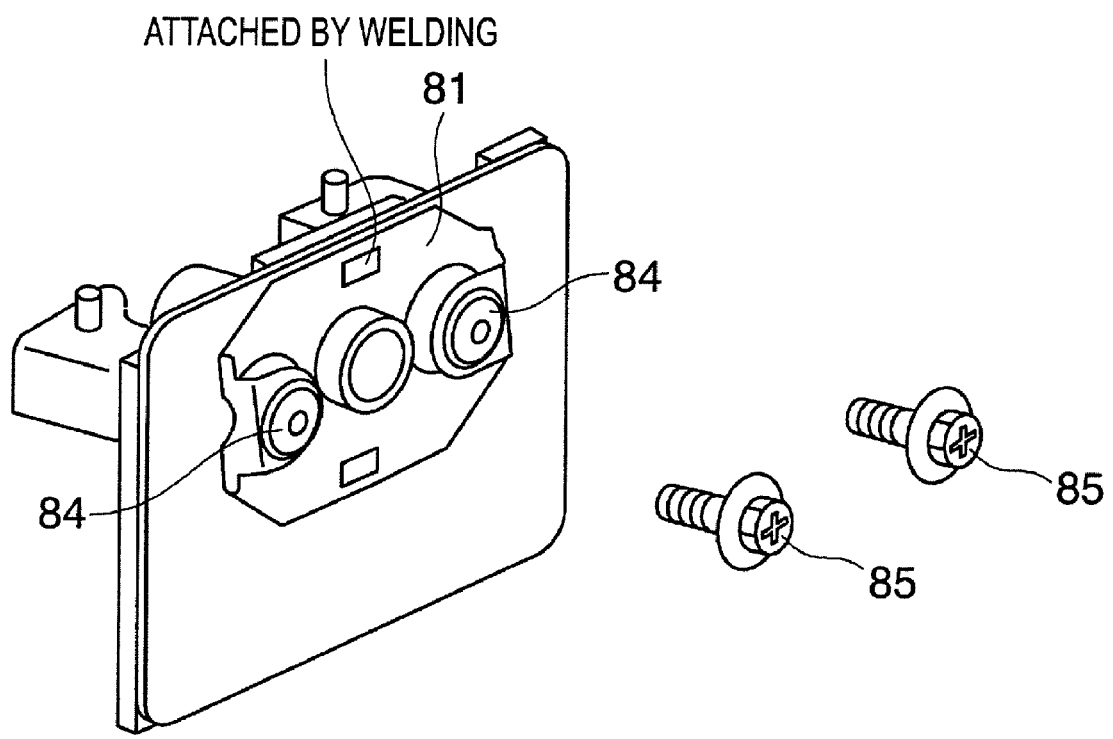
FIG. 12 is a perspective configuration view showing the structure of attaching an optical component relating to Exemplary embodiment 1 of the invention.

As shown in FIGS. 10 and 11, an attachment plate 81 for attaching the holding member 60 to the printed wiring board assembly 53 is screwed by screws 82 to the back face of the base plate 61 of the holding member 60. The attachment plate 81 is formed in a horizontally elongated flat and substantially rectangular shape in a plan view. Screwing portions 83, 83 which are folded back in parallel to the base plate 61 of the holding member 60 are disposed at the both lateral ends of the plate. Female threads 84 are attached to the screwing portions 83 by means of welding or the like. As shown in FIG. 11, the attachment plate 81 is fixed to the base plate 61 of the holding member 60 by the screws 82. The fixation method is not restricted to this. As shown in FIG. 12, the attachment plate 81 may be fixed to the base plate 61 of the holding member 60 by means of welding.

As shown in FIGS. 10 and 11, the thus configured holding member 60 is attached to the printed wiring board assembly 53 by screwing of attachment screws 85 into the female threads 84 of the attachment plate 81, in a state where the tip end face of the butting portion 79 butts against the reference face 58 of the semiconductor laser light source 20.

In the thus configured base plate 61 of the holding member 60, as shown in FIG. 1, a seal member 86 configured by a sponge and the like is bonded to the surface of the base plate 61 by an adhesive agent or the like in order to prevent toners, paper dusts, and the like from entering through the opening 52 of the device housing 50.

Figure 13:
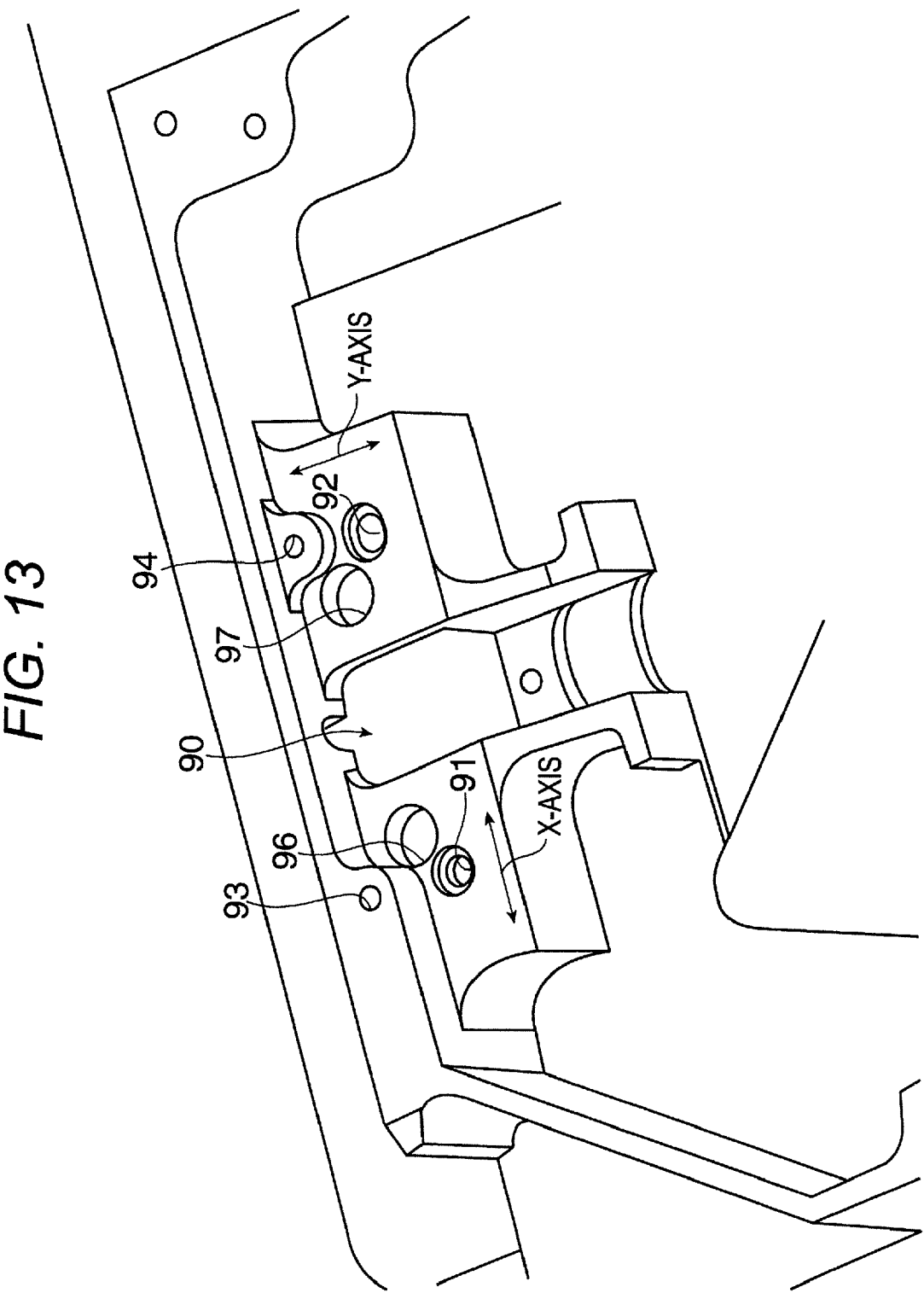
FIG. 13 is a perspective configuration view showing the structure of attaching an optical component relating to Exemplary embodiment 1 of the invention.
Figure 14:
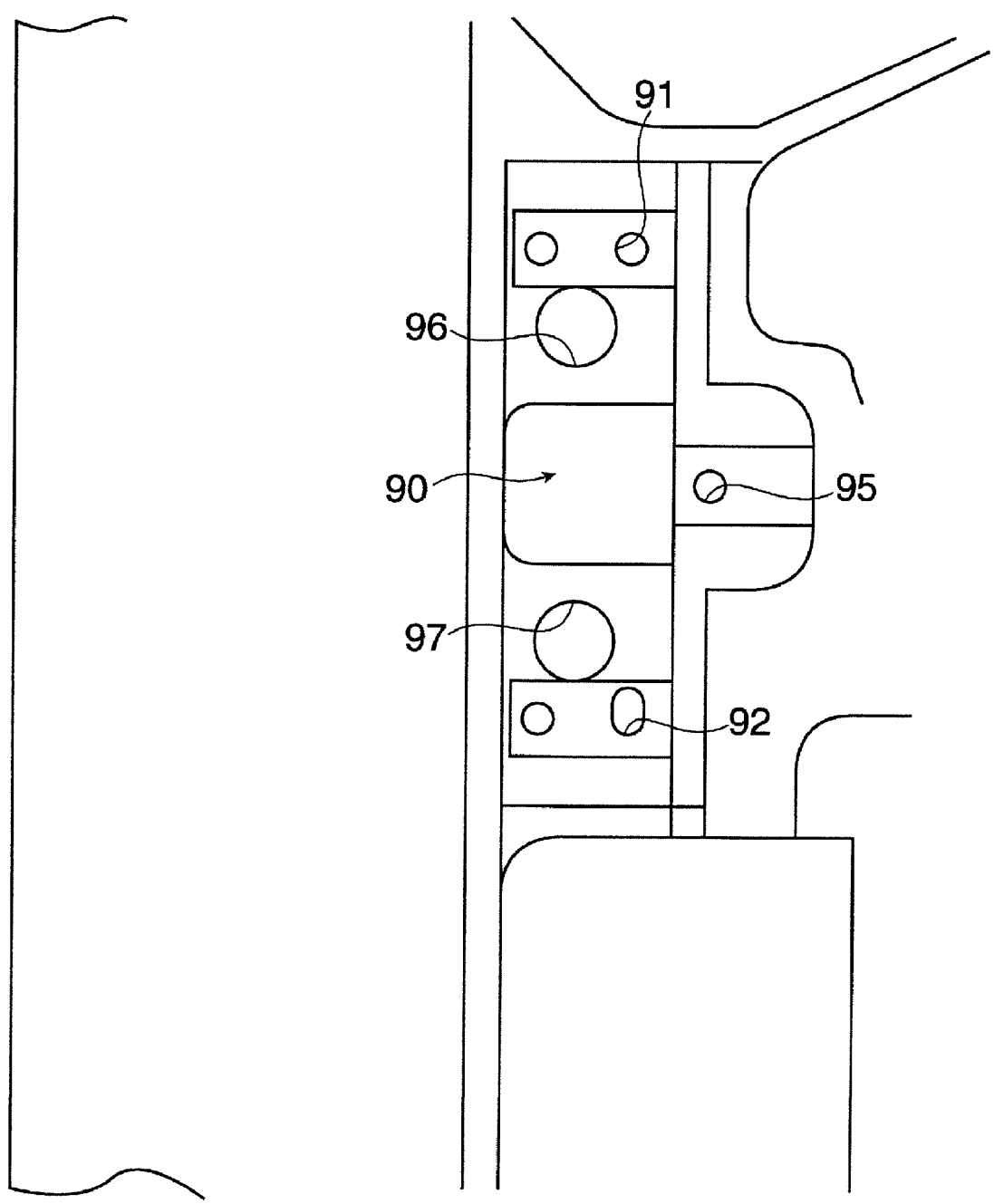
FIG. 14 is a perspective configuration view showing the structure of attaching an optical component relating to Exemplary embodiment 1 of the invention.
Figure 16:
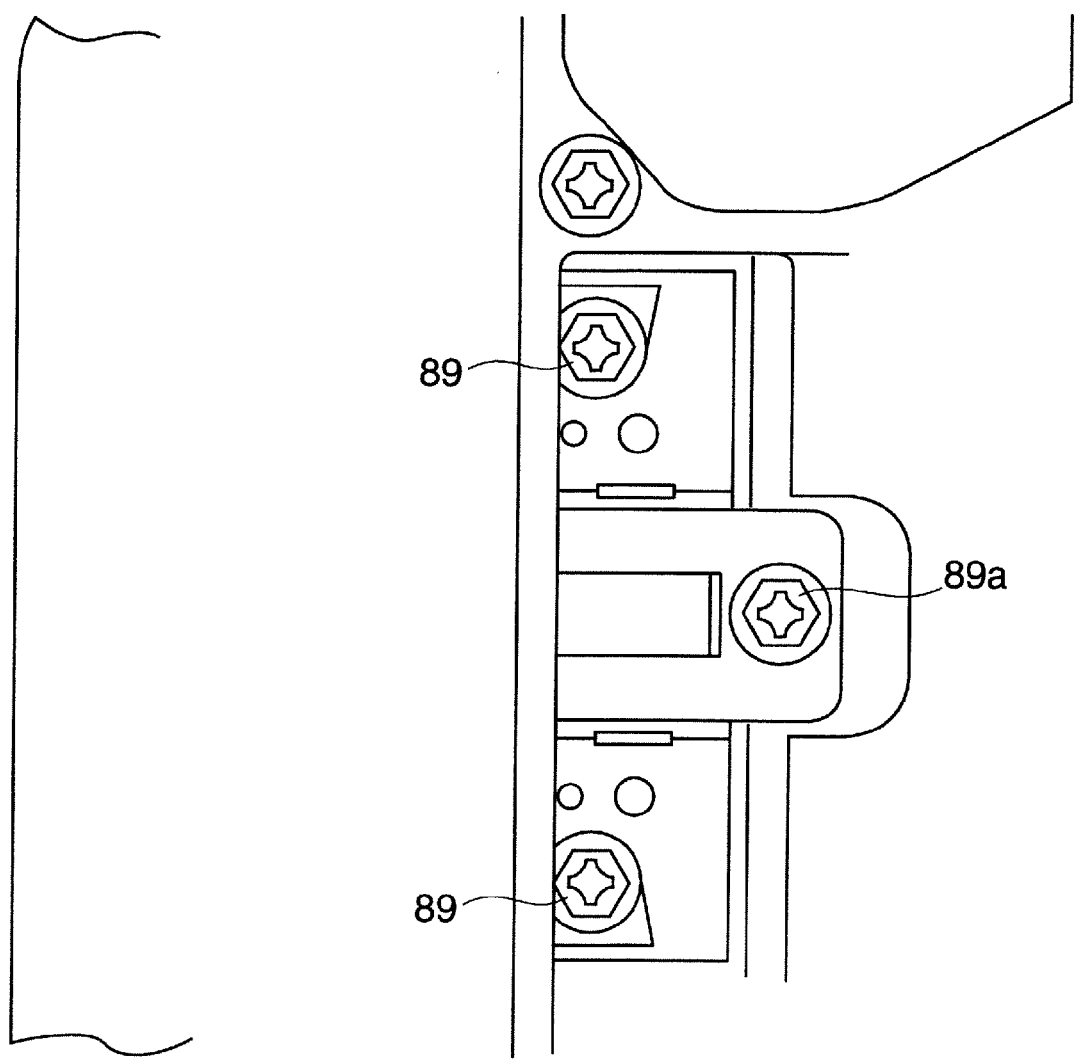
FIG. 16 is a perspective configuration view showing the structure of attaching an optical component relating to Exemplary embodiment 1 of the invention.
Figure 17:
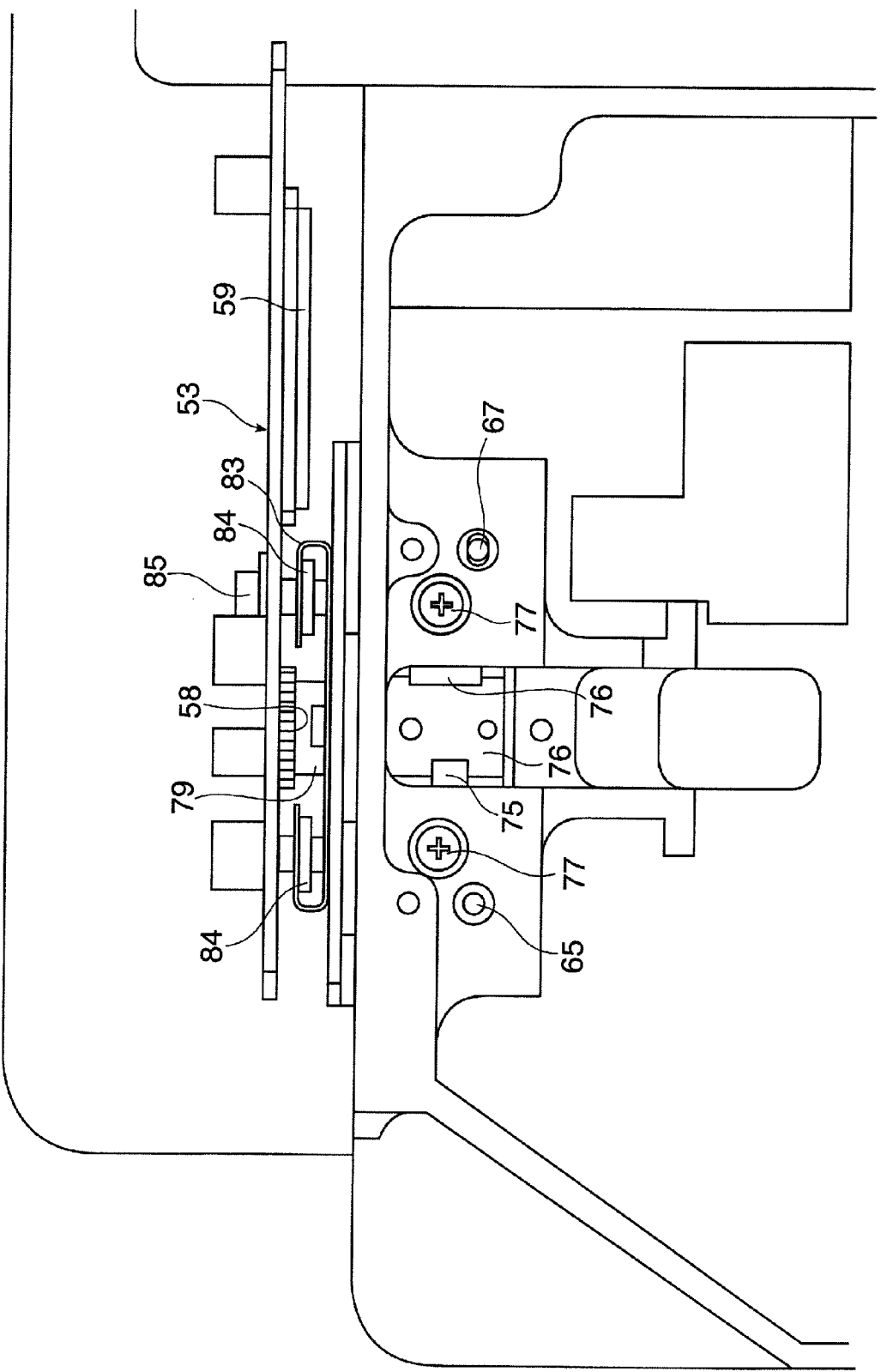
FIG. 17 is a perspective configuration view showing the structure of attaching an optical component relating to Exemplary embodiment 1 of the invention.

Then, the holding member 60 to which the collimator lens 21 is attached as described above is mounted on the device housing 50 of the optical scanning device 15 in the following manner. In the device housing 50, as shown in FIG. 13, an attachment recess 90 for attaching the holding member 60 in a state where the holding member is positioned in the three or XYZ axis directions is disposed in the side wall 51 at which the opening 52 is disposed. The attachment recess 90 has a space into which the holding member 60 to which the collimator lens 21 is attached can be inserted. First and second hole portions 91, 92 for attaching the first and second protrusions 65, 67 of the holding member 60 in a positioned state, female thread portions 93, 94 for, as shown in FIG. 16, performing screwing from the bottom face of the device housing 50 to the first and second insertion holes 66, 68 of the holding member 60 by screws 89, and a female thread portion 95 for performing screwing through the insertion hole disposed at the second flat plate portion 64 of the holding member 60 are disposed.

Figure 15:
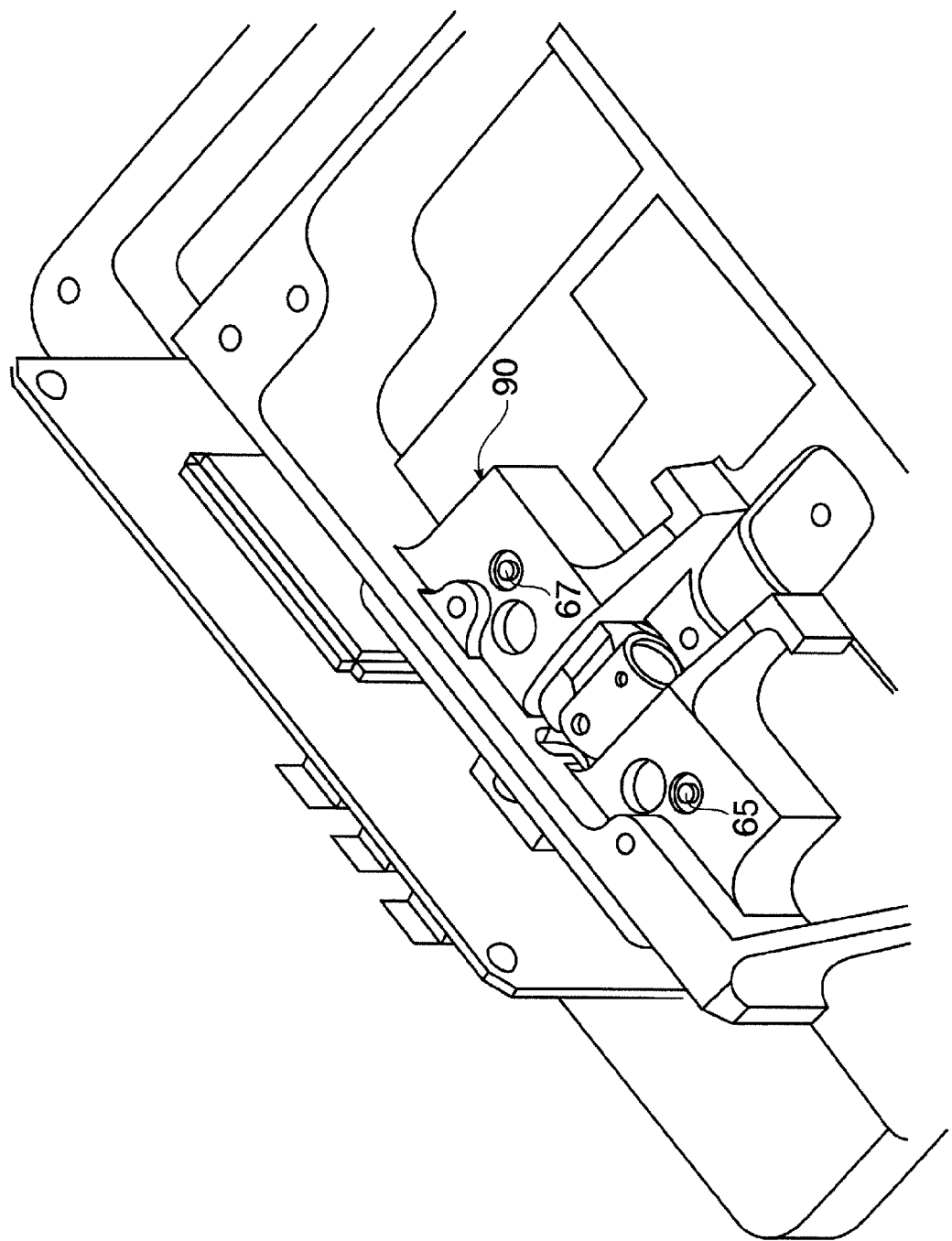
FIG. 15 is a perspective configuration view showing the structure of attaching an optical component relating to Exemplary embodiment 1 of the invention.

As shown in FIG. 15, the first hole portion 91 to which the first protrusion 65 of the holding member 60 is attached in a state where it is positioned in the X-axis direction is formed into a circular shape into which the first protrusion 65 is inserted in a state where it is positioned in the X-axis direction. The second hole portion 92 to which the second protrusion 67 of the holding member 60 is attached in a positioned state is formed into an oval shape into which the second protrusion 67 is inserted in a state where it is positioned in the Y-axis direction, and configured so that, even in the case where positional displacement in the X-axis direction occurs between the second protrusion 67 and the second hole portion 92, such displacement allows.

The first and second insertion holes 66, 68 of the holding member 60 disposed at the device housing 50 are formed so as to have a relatively large diameter, and configured so that, even in the case where slight positional displacement occurs between the first and second insertion holes 66, 68 of the holding member 60 and the female thread portions 93, 94, such displacement allows.

The third female thread portion 95 for screwing a screw 89a inserted into the third insertion hole 69 of the holding member 60 disposed at the device housing 50 is configured so as to perform the positioning in the Z-axis direction in a state where the surface of the second flat plate portion 64 butts against the reference face of the device housing 50.

In the device housing 50, as shown in FIG. 13, openings 96, 97 for adjusting the attachment position of the collimator lens 21 are disposed.

According to the above configuration, in the image forming apparatus using the optical scanning device to which the structure of holding an optical component of the exemplary embodiment is applied, the rigidity of the holding member which holds the optical component is enhanced, and accurate positioning the optical component is enabled in the following manner.

In the optical scanning device 15 to which the structure of holding an optical component is applied, when the collimator lens 21 functioning as an optical component is to be attached to the device housing 50, as shown in FIGS. 4 and 5, the holding member 60 which holds the collimator lens 21 is attached in a state where sheet metals which are metal plate members are coupled to each other by welding or the like, whereby the rigidity of the holding member 60 is largely enhanced.

As shown in FIG. 8, the holding member 60 includes the sheet metal-made base plate 61 which is placed so as to intersect with the optical axis C of the collimator lens 21. The first flat plate portion 63 which constitutes the first hierarchy, and the second flat plate portion 64 which constitutes the second hierarchy are opposed to each other in the state where they are coupled to each other, and welded to the base plate 61 in the state where the plate portions stand while intersecting with each other at about 90 degrees.

Furthermore, the first and second protrusions 65, 67 for positioning in the X- and Y-axis directions are disposed at the first flat plate portion 63, and the insertion hole 69 for positioning in the Z-axis direction is disposed at the second flat plate portion 64. The first and second protrusions 65, 67 and the insertion hole 69 allow the holding member 60 to which the collimator lens 21 is attached and held, to be accurately attached to the device housing 50.

In the holding member 60, the collimator lens 21 is held to the holding portion 70 which is disposed over the first and second flat plate portions 63, 64 that are positioned as described above. As a result, therefore, the collimator lens 21 can be accurately attached to the device housing 50.

Exemplary Embodiment 2

Figure 18:
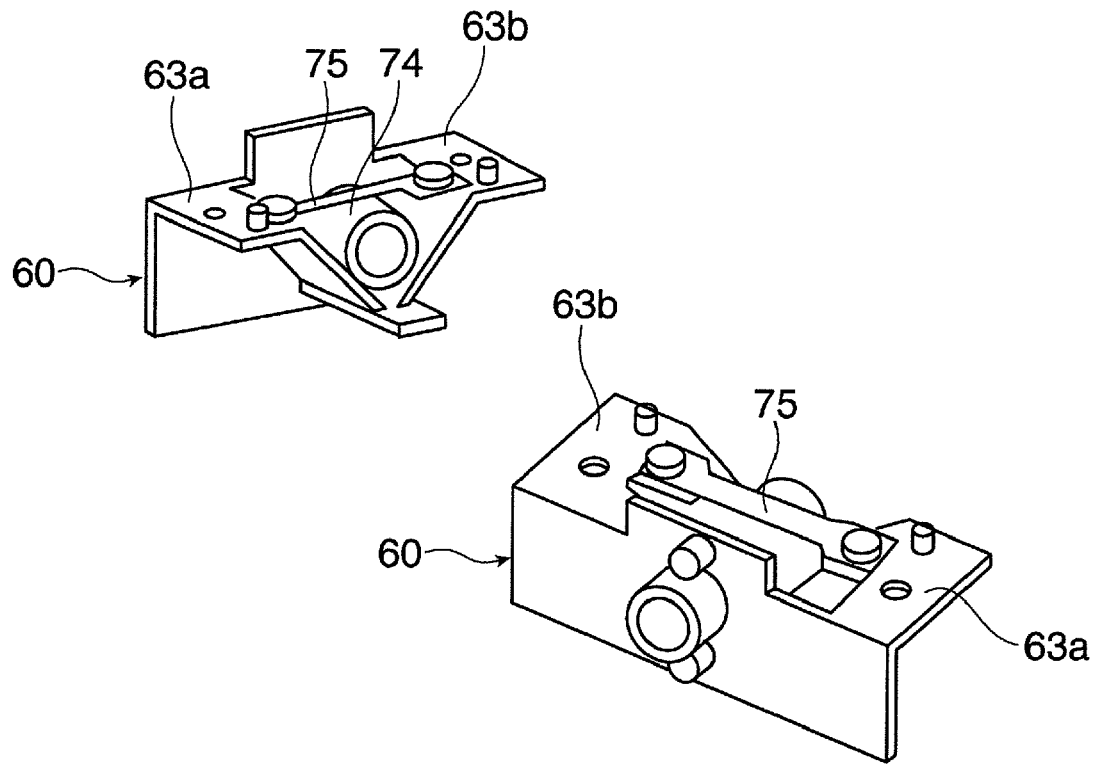
FIG. 18 is a perspective configuration view showing a structure of attaching an optical component relating to Exemplary embodiment 2 of the invention.
Figure 19:
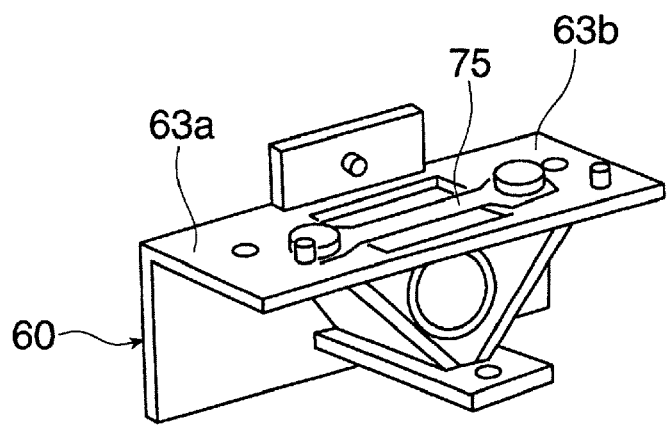
FIG. 19 is a perspective configuration view showing the structure of attaching an optical component relating to Exemplary embodiment 2 of the invention.

FIGS. 18 and 19 show Exemplary embodiment 2 of the invention. Description will be made while denoting the same components as those of Exemplary embodiment 1 by identical reference numerals. In the exemplary embodiment, the first flat plate portion and the holding portion are integrally formed.

As shown in FIG. 18, Exemplary embodiment 2 is configured so that the left and right first flat plate portions 63a, 63b function also as the left and right attaching pieces 71a, 71b of the holding portion 70, and the collimator lens 21 held by the holding piece 72 of the holding portion 70 is fixed by the pressing member 75 screwed to the left and right first flat plate portions 63a, 63b.

In this case, the configuration of the holding member 60 can be simplified, and the production cost can be reduced.

As shown in FIG. 19, Exemplary embodiment 2 may be configured so that the left and right first flat plate portions 63a, 63b are connected to each other, and the holding portion 70 is attached to the left and right first flat plate portions 63a, 63b.

The other configuration and functions are identical with those of Exemplary embodiment 1, and hence their description is omitted.

Exemplary Embodiment 3

Figure 20:
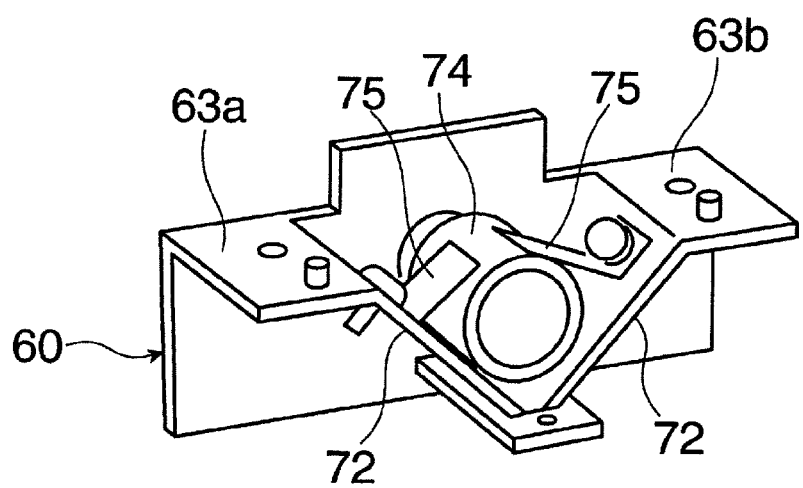
FIG. 20 is a perspective configuration view showing a structure of attaching an optical component relating to Exemplary embodiment 3 of the invention.
Figure 21:
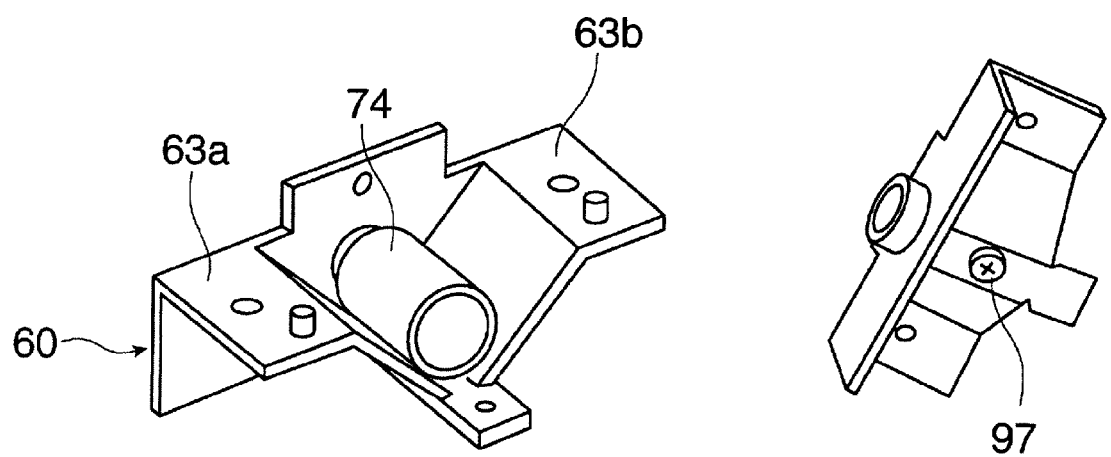
FIG. 21 is a perspective configuration view showing the structure of attaching an optical component relating to Exemplary embodiment 3 of the invention.

FIGS. 20 and 21 show Exemplary embodiment 3 of the invention. Description will be made while denoting the same components as those of Exemplary embodiment 1 by identical reference numerals. Exemplary embodiment 3 is configured so that, in the same configuration as Exemplary embodiment 2, the structure of fixing the collimator lens 21 is different from that of Exemplary embodiment 2.

As shown in FIG. 20, Exemplary embodiment 3 is configured so that an attaching member for holding the collimator lens 21 is not screwed to the left and right first flat plate portions 63a, 63b, and attaching member 74, 75 are screwed to the holding piece 72 of the holding portion 70.

In the exemplary embodiment shown in FIG. 21, it may be configured so that the lens holder 74 which holds the collimator lens 21 is directly fixed to the second attaching portion 64 by a screw 97.

In this case, similarly, the configuration of the holding member 60 can be simplified, and the production cost can be reduced.

The other configuration and functions are identical with those of Exemplary embodiment 1, and hence their description is omitted.

Exemplary Embodiment 4

FIG. 22 shows Exemplary embodiment 4 of the invention. Description will be made while denoting the same components as those of Exemplary embodiment 1 by identical reference numerals. Exemplary embodiment 4 is configured so that, in the same configuration as Exemplary embodiment 2, the structure for fixing the collimator lens 21 is different from that of Exemplary embodiment 2.

As shown in FIG. 22, Exemplary embodiment 4 is configured so that cut-out portions 98, 99 are disposed at the holding piece 72 of the holding portion 70 by a pressing process or the like, the cut-out portions 98, 99 are horizontally bent, and attaching members 75, 76 which hold the collimator lens 21 are screwed to the bent portions 98, 99.

In this case, similarly, the configuration of the holding member 60 can be simplified, and the production cost can be reduced.

The other configuration and functions are identical with those of Exemplary embodiment 1, and hence their description is omitted.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A structure for holding an optical component, comprising:
    first and second flat plate portions that are provided in a state where the portions stand on a base plate, that are opposed to each other in a state where the flat plate portions are coupled to each other, and that constitute first and second hierarchies, respectively;
    first and second positioning portions that are provided at the first flat plate portion, and that determine positions of directions of first and second coordinate axes of first, second, and third coordinate axes that intersect with each other;
    a third positioning portion that is provided at the second flat plate portion, and that determines a position of a direction of the third coordinate axis of the first, second, and third coordinate axes that intersect with each other; and
    a holding portion that is coupled to the first flat plate portion or the second flat plate portion, and that holds the optical component.

2. The structure for holding an optical component according to claim 1, wherein the first and second flat plate portions are attached by welding to the base plate that is placed to intersect with an optical axis of the optical component.

3. An optical scanning device comprising:
    a semiconductor laser light source that emits at least one laser beam;
    a collimator lens that is provided on a side of an emission face of the semiconductor laser light source;
    a holding member that holds the collimator lens in a fixed state, and that is a metal-made plate, the holding member having first and second flat plate portions that are provided in a state where the portions stand on a base plate, that are opposed to each other in a state where the flat plate portions are coupled to each other, and that constitute first and second hierarchies, respectively, first and second positioning portions that determine positions of directions of first and second coordinate axes of first, second, and third coordinate axes that intersect with each other being provided at the first flat plate portion, a third positioning portion that determines a position of a direction of the third coordinate axis of the first, second, and third coordinate axes that intersect with each other being provided at the second flat plate portion, a holding portion that is coupled to the first flat plate portion or the second flat plate portion, and that holds the collimator lens; and
    a rotary polygon mirror that scans the laser beam that is emitted from the semiconductor laser light source, and that is passed through the collimator lens.

4. The optical scanning device according to claim 3, wherein a cylindrical portion that butts against a reference face on an emission side of the semiconductor laser light source, to position the semiconductor laser light source with respect to the holding member is provided on a back face side of the base plate of the holding member.

5. An image forming apparatus comprising:
    a semiconductor laser light source that emits at least one laser beam in accordance with image information;
    a collimator lens that is provided on a side of an emission face of the semiconductor laser light source;
    a holding member that holds the collimator lens in a fixed state, and that is a metal-made plate, the holding member having first and second flat plate portions that are provided in a state where the portions stand on a base plate, that are opposed to each other in a state where the flat plate portions are coupled to each other, and that constitute first and second hierarchies, respectively, first and second positioning portions that determine positions of directions of first and second coordinate axes of first, second, and third coordinate axes that intersect with each other being provided at the first flat plate portion, a third positioning portion that determines a position of a direction of the third coordinate axis of the first, second, and third coordinate axes that intersect with each other being provided at the second flat plate portion, a holding portion that is coupled to the first flat plate portion or the second flat plate portion, and that holds the collimator lens;
    a rotary polygon mirror that scans the laser beam that is emitted from the semiconductor laser light source, and that is passed through the collimator lens; and
    an image carrier that is scan-exposed by the laser beam that is scanned by the rotary polygon mirror.

* * * * *